United States Patent [19]

Daly et al.

[11] Patent Number: 4,979,105
[45] Date of Patent: Dec. 18, 1990

[54] METHOD AND APPARATUS FOR AUTOMATIC RECOVERY FROM EXCESSIVE SPIN LOOPS IN AN N-WAY MULTIPROCESSING SYSTEM

[75] Inventors: James C. Daly, Millbrook; Jeffrey M. Nick, Fishkill; Franklin J. Rodegeb, Wappingers Falls, all of N.Y.

[73] Assignee: International Business Machines, Armonk, N.Y.

[21] Appl. No.: 221,169

[22] Filed: Jul. 19, 1988

[51] Int. Cl.$^5$ .............................................. G06F 11/00
[52] U.S. Cl. .................................. 364/200; 364/266; 364/267.7; 364/281.5; 364/262.2; 371/16.3; 371/7
[58] Field of Search ... 364/200 MS File, 900 MS File, 364/300; 371/7, 8.1, 9.1, 12, 16.1, 16.3, 62

[56] References Cited

U.S. PATENT DOCUMENTS

| | | | |
|---|---|---|---|
| 3,575,589 | 4/1971 | Neema | 371/7 |
| 4,606,024 | 8/1986 | Glass et al. | 371/16.1 |
| 4,663,709 | 5/1987 | Fujihara et al. | 364/200 |
| 4,716,528 | 12/1987 | Crns et al. | 364/300 |
| 4,805,106 | 2/1989 | Pfeifer | 364/200 |
| 4,866,712 | 9/1989 | Clao | 371/7 X |

OTHER PUBLICATIONS

Chow et al, "Dynamic Control of 'Luck' Access Strategy in Multiprocessing-Multiprogramming Systems", IBM 7DB, vol. 23, No. 2, Jul. 1980, pp. 849-852.
IBM TDB, vol. 16, #6, pp. 2005-2010, Nov. 1973 by D. P. Casey and R. S. Wasserman: Alternate CPU Recovery.
IBM TDB, vol. 16, #7, pp. 2420-2422, Dec. 1973 by P. H. Gum et al.: Locking Architecture in a Multiple Virtual Memory Multiprocessing Sys.
IBM TDB, vol. 26, #2, pp. 784-787, Jul. 1983 by J. C. Daly & J. T. Rodell: Time-Out/Voting Algorithm for Resource Contention in N-Way....

Primary Examiner—Thomas C. Lee
Attorney, Agent, or Firm—William B. Porter

[57] ABSTRACT

A program executing on a first processor in an MP configuration awaiting the release of a resource held by another processor, detects the expiration of a fixed time interval, and initiates a hierarchy of recovery actions designed to cause the resource to be freed. These actions, targeted at a processor believed to be the one currently holding the resource, are taken only if that processor is not executing an "exempt" routine. The actions, taken in order of increasing severity, are: wait for a second fixed time interval; terminate the routine on the resource-holding processor, allowing retry; terminate the routine without allowing retry; invoke Alternate CP Recovery. The hierarchy is escalated against the target processor until that processor releases the resource, and against other processors in the configuration until the resource is acquired by the first processor. These actions may proceed in parallel for multiple detecting and target processors within an MP environment.

11 Claims, 5 Drawing Sheets

FIG. 2A EXCESSIVE SPIN LOOP RECOVERY PROCESSING

METHOD AND APPARATUS FOR AUTOMATIC RECOVERY FROM EXCESSIVE SPIN LOOPS IN AN N-WAY MULTIPROCESSING SYSTEM

FIELD OF THE INVENTION

This invention relates to the field of systems control programming. More specifically, it relates to mechanisms for detecting and recovering from spin loop situations in multiprocessor system configurations.

DESCRIPTION OF THE PRIOR ART

A spin loop is a condition which occurs in a multiprocessor (MP) system when a routine executing on one Central Processor (CP) is unable to complete a function due to a dependence on some action being taken on another CP. If the function must be completed before further processing can be performed, the routine may enter a loop and spin waiting for the required action to be taken on the other CP.

Spin loops typically occur in systems such as MVS/XA and MVS/ESA when a system routine is attempting to perform one of the following functions:

1. Communicate with other CPs—For example, when an MVS system routine running on one CP determines that an address space should be swapped out of main storage, it is necessary to notify all other CPs to purge their translation lookaside buffers of addresses related to that address space. This is accomplished by issuing a SIGP (Signal Processor) Emergency Signal to the other CPs. Until each CP responds with an indication that it has performed the required purge, the initiating MVS routine will enter a spin loop to await completion of the required action.

2. Serialization of function across all CPs—MVS uses system locks to serialize execution of many functions across all of the CPs in the system. This is necessary to ensure the integrity of the operation being performed. The general locking architecture used in the MVS system is described in the IBM Technical Disclosure bulletin, Volume 16, No. 7, at page 2420. As an example, if an MVS routine on one CP wishes to process the results of an I/O interrupt from a device, it must ensure that status about the interrupt is not inadvertently corrupted by a system routine on another CP wishing to initiate a new I/O operation to the device. This is accomplished via the use of a system lock per device. If a system routine requires the lock for a given device which is owned by a routine on another CP, it will enter a spin loop until the lock becomes available.

Spin loops are a normal phenomenon of an MP system. They are almost always extremely brief and non-disruptive to the operating environment. However, when their duration becomes excessive, spin loops become a problem which requires recovery action to resolve. In the prior art, those actions were determined and performed by the system operator.

Excessive spin loop (ESL) conditions can be triggered for a wide variety of causes. For example, the CP which is holding a resource required by the routine spinning on another CP may be:
Experiencing a hardware failure
Experiencing a software failure
Performing a critical function which takes an unusually long period of time to complete
Stopped by the operator or by the operating system In the past, the MVS operating system detected the existence of an ESL and surfaced the condition to the system operator. The detection was performed by the routine in the spin loop, after spinning for a full ESL timeout interval, which was approximately 40 seconds in MVS. It then invoked the Excessive Spin Notification Routine, to issue a message to the operator requesting recovery action.

Determination of the correct recovery action to resolve an ESL condition is complex, error-prone, and especially critical given the severe impact such a condition has on the operating system. Due to the frequency of inter-processor communication and cross-CP resource serialization in an MP environment, when one CP fails, all other CPs very quickly enter spin loops until the problem on the failing CP is resolved.

According to the prior art, there were three recovery actions that an operator can take when an ESL occurs. Each has benefits and drawbacks associated with it. The actions are as follows:

1. Respond to the ESL message to continue to spin on the detecting CP for another excessive spin loop interval.

This will only have benefit if the cause of the spin loop is temporary, i.e., if it is due to some unusually lengthy but legitimate processing on the CP causing the condition.

The problem here is that neither the operator nor MVS knows whether the condition is temporary or not. If the operator does not respond to continue the spin and instead performs a recovery action, the possibility exists that an important MVS system function will be the target of that destructive recovery action. This may even result in an unnecessary system crash. On the other hand, if the operator does decide to continue the spin, how many times should the spin be allowed to repeat before taking a more forceful action? Each response to continue in the spin loop further prolongs the time that the system is unavailable.

2. Respond to the ESL message to trigger the MVS Alternate CP Recovery (ACR) function for the failing CP. The general ACR function is described in IBM Technical Disclosure Bulletin, Volume 16, No. 6, at page 2005. The algorithm used to determine which is the failing CP in an N-way environment is described in IBM Technical Disclosure Bulletin, Volume 26, No. 2 at page 784.

This causes the recovery routines protecting the program running on the failing CP to be invoked. This is done to allow the recovery routines to release resources held on the failing CP which may be required by the CP currently in a spin loop.

The drawback of this action is that it also results in removing the "failing" CP from use by the MVS operating system. Experience has shown that excessive spin loops are usually caused by non-CP related hardware or software errors. The recovery processing associated with ACR may resolve the spin loop but removing the CP from the configuration is highly disruptive and also unnecessary in the majority of spin loop scenarios.

Even with a highly-skilled operator, who determines and performs each recovery action after only 30 seconds delay, the system is completely unavailable for several minutes. In addition, the CP is unnecessarily removed from system use for an undetermined period of time.

Another drawback of the ACR action can be that recovery routines are allowed to retry after being invoked. Therefore, the ability of the ACR action to resolve the spin loop and avoid a system outage is highly dependent on the effectiveness of the recovery routines protecting the failing program. If the recovery routines do not release the resources required by the CP in the spin loop, or retry back to a point in the failing program which caused the problem to begin with, the spin loop condition will not be resolved.

3. Respond to the ESL message to continue the spin on the detecting CP AND initiate a RESTART from the system console to interrupt the routine executing on the failing CP. This action will trigger invocation of recovery routines to force the release of resources held on the failing CP.

The drawback of this action is that it results in termination of the current unit of work because recovery routines are not allowed to retry when RESTART is invoked. Thus, even though the recovery routines may be able to successfully resolve the problem causing the spin loop, the program is forced to terminate. If a critical job or subsystem is active on the failing CP when the spin loop is detected, invocation of RESTART will cause loss of that critical subsystem and perhaps require re-IPL of the system.

Another drawback is that the RESTART procedure is more complicated than simply responding to a message and is therefore prone to operator error.

Most ESL conditions, due to operator error or inadequate recovery options, end with a system crash and an extended outage requiring re-IPL.

In addition to the complexities of the recovery decisions required by the operator to recover from an ESL condition, the mechanics of effecting that recovery become significantly more involved if the operator is unable to answer the spin loop message and instead must respond to the spin loop restartable wait state. For example, for an ACR response, the operating procedure involves:

1. Stopping all CPs in the system
2. Storing the ACR response in main storage on the detecting CP (which may be in violation of the installation's policies)
3. Starting all the CPs except the detecting and failing CPs
4. Restarting the detecting CP to initiate recovery.

SUMMARY OF THE INVENTION

The present invention is a system and process in a multiprocessor system environment, for detecting and taking steps to automatically recover from excessive spin loop conditions. It comprises functions and supporting indicators that clearly identify true spin loop situations, and present a hierarchical series of recovery actions, some new to the ESL environment, that minimize the impact of the condition to the multiprocessor system, and its workload.

It is an object of the present invention to provide an automatic and efficient mechanism for detecting and recovering from excessive spin loop situations in an MP environment.

It is a further object of this invention to recognize persistent, related spin loop situations in an MP environment, and recover automatically from them. This includes recovering in parallel from multiple ESL occurrences involving more than one failing CP.

It is a further object of this invention to present a hierarchy of recovery actions representing progressively more severe actions, so that a severe action is taken only when a less severe action has failed to resolve the problem.

DESCRIPTION OF THE PREFERRED EMBODIMENT

Figure 1:
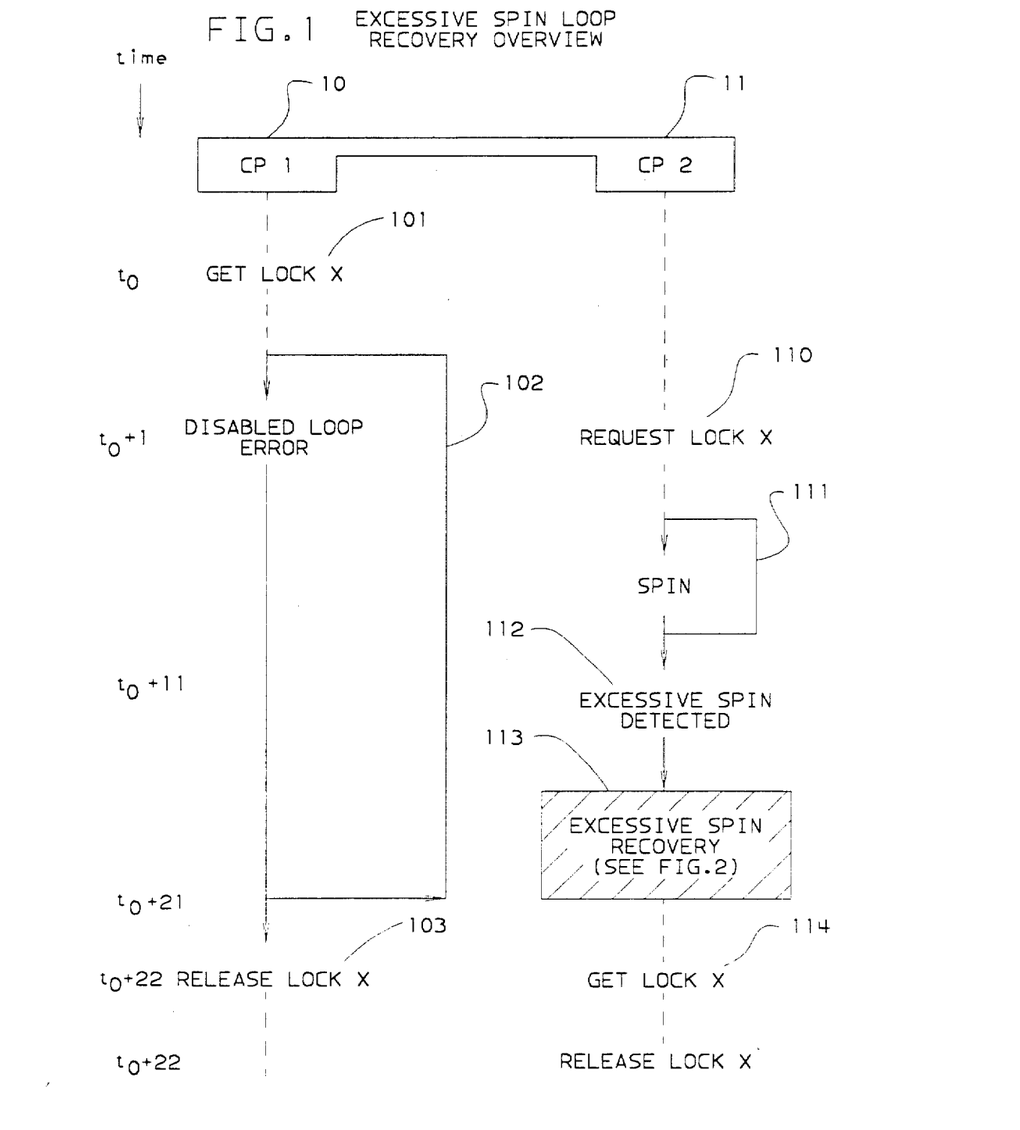
FIG. 1 is a linear time flow diagram showing an overview of the Excessive Spin Loop Recovery (ESLR) Function operating in a 2-way MP environment.

FIG. 1 shows an environment in which an embodiment of the present invention operates. It illustrates a 2-way MP system consisting of Central Processor 1 (10) and Central Processor 2 (11). Central Processor 1, having obtained spin-type lock x at time t0 (101), subsequently enters a disabled loop (102); Central Processor 2, requesting spin lock x at time to +1 (110), is unable to obtain it, and so "spins", periodically re-requesting the lock (111).

As with systems of the prior art, it is the responsibility of the processes which have requested a spin-type lock to determine that a "long" time has elapsed since the lock was required (a time interval referred to as the ESL, or Excessive Spin Loop, interval); having recognized that this period of time has elapsed, (112), the requesting processor invokes the Excessive Spin Loop Recovery (ESLR) processing of this invention (113). This processing ultimately results in the release of the lock by processor 1 (103), and allows the subsequent acquisition of the lock by processor 2 (114).

Figure 2A:
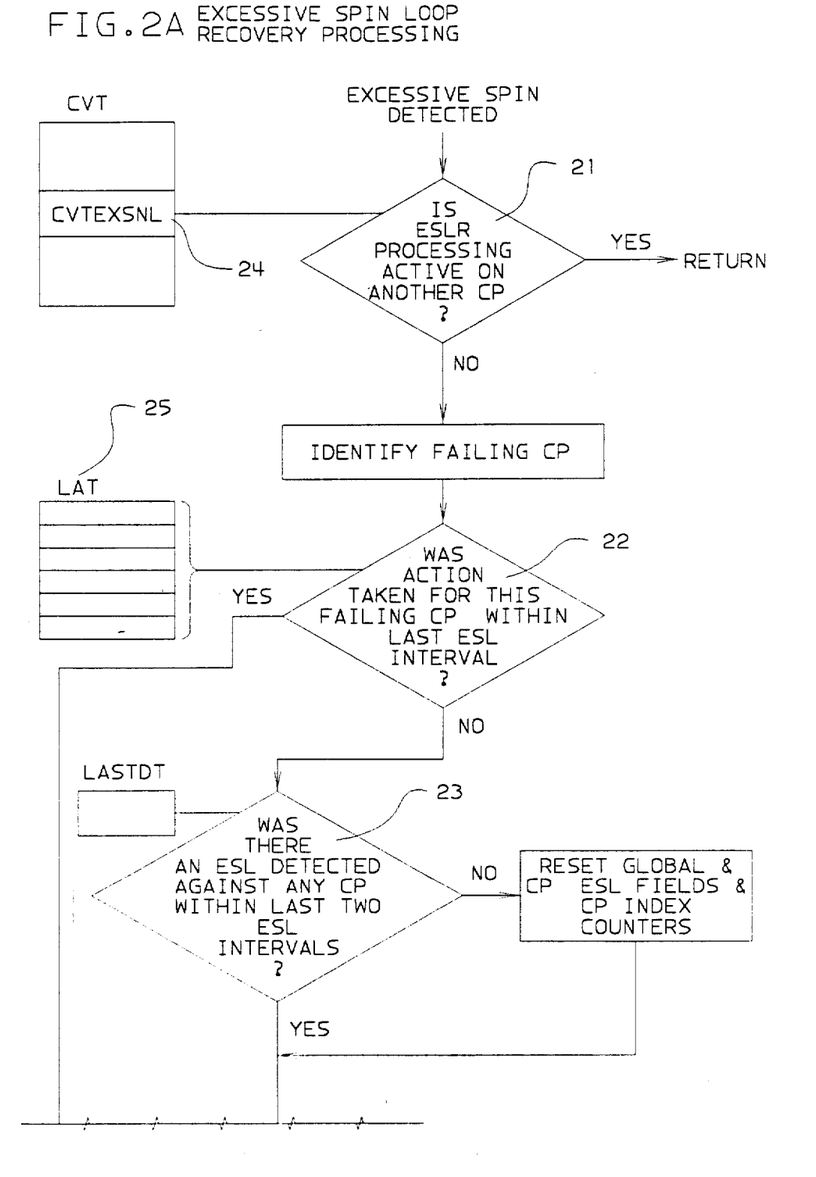
FIGS. 2A and 2B together is a function flow diagram outlining Excessive Spin Loop Recovery processing.
Figure 2B:
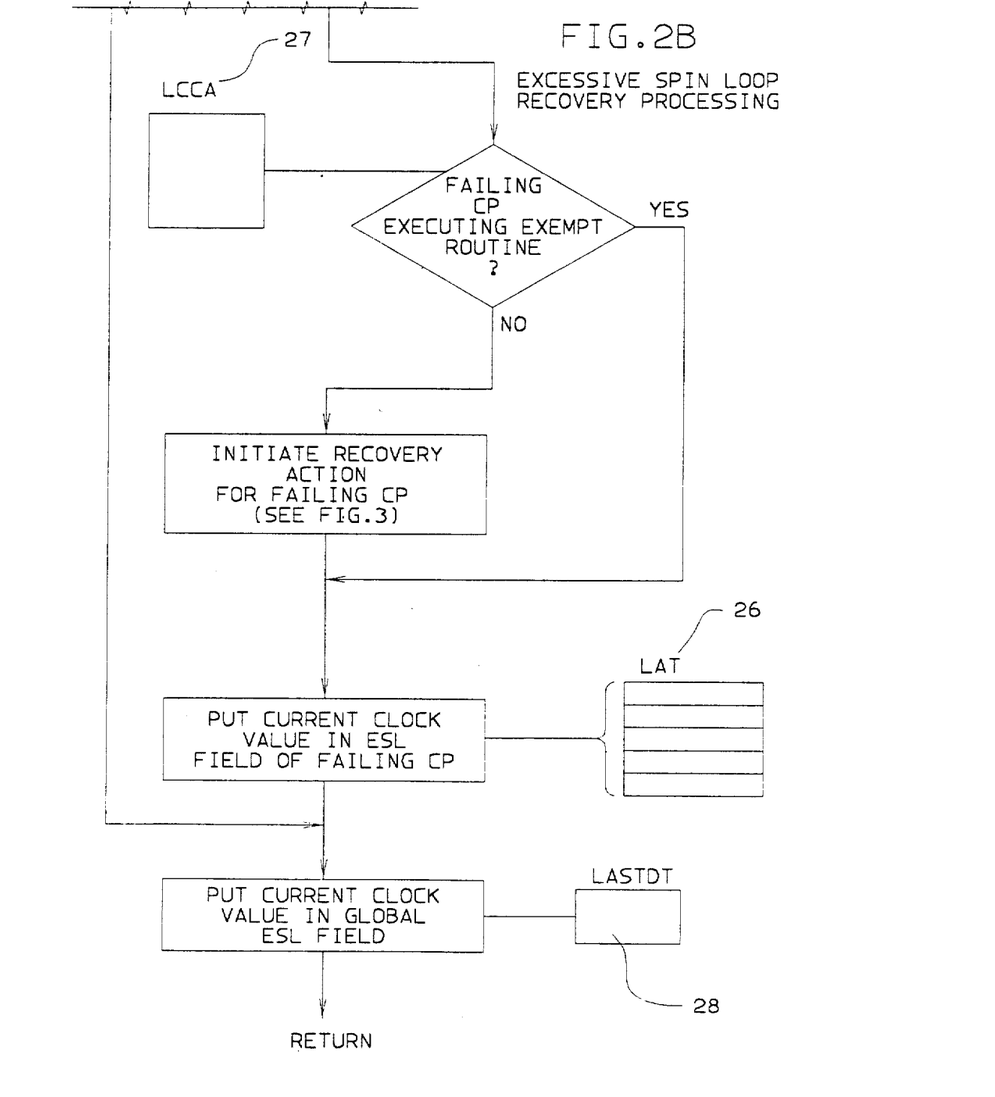

Referring to FIG. 2, excessive spin loop recovery processing is entered when the CP requesting the lock detects that it has been waiting for the lock for an excessive amount of time. On entry, this routine checks to determine whether excessive spin loop recovery processing is active on any other CP in the complex by checking the CVT global control block (24) via the atomic "Test and Set" operation. If the answer is yes, there is an immediate return and this indication is not treated as a detection of an excessive spin loop.

If the answer is no, the failing CP is identified as indicated in the aforementioned TDB (Vol. 26, No. 2, at p. 748), and the identity of the failing CP is saved. A check is then made (22) to see whether any spin loop recovery action was taken for this failing CP within the last excessive spin loop interval. If so, subsequent recovery processing is bypassed. In tightly-coupled MP systems of three of more CPs, this is done because two different CPs could enter ESLs against the same failing CP within the same interval. When the first of these two ESLs results in a recovery action, the second ESL must be prevented from initiating another (more disruptive) action before the first one has a chance to complete.

The Excessive Spin Loop Recovery Processor (ESLR) maintains a table in global storage showing the time of the last ESL recovery action taken against each CP. This Last Action Taken (LAT) Table (25) has one entry per CP. ESLR then compares the clock value on entry with the LAT entry for the failing CP. If an ESL interval has not passed since the last action against this failing CP, no action is taken. However, the last detection time LASTDT (28) field is updated because this detection must be recorded to ensure the proper determination of a persistent problem. The clock value is again obtained and then stored in the global ESL field (28), indicating that this detection is treated as a global detection, and the routine returns to the caller.

If no action was taken for this CP within the last ESL interval, a check is made to see if an ESL was detected against any CP within the last two ESL intervals (23).

The question here is whether two consecutive (ESL) occurrences represent repeated manifestations of the same problem (i.e., a persistent problem) or whether each ESL occurrence represents a separate problem. If an ESL is identified as occurring for a persistent problem, the recovery action for that ESL will be the next one in the series of increasingly severe actions for that particular failing CP.

If an ESL is determined to be the initial manifestation of a problem, all the ESL indicators for all CPs are reset so that any sequence of actions for any CP starts at the first action.

The Excessive Spin Loop Recovery Processor (ESLR) maintains a field (LASTDT) (28) in global storage showing the time of the last detection of an ESL against ANY CP.

A persistent problem exists if: T-LASTDT<2-×ESLI where:
T=time of this entry to the ESL Recovery routine
ESLI=excessive spin loop interval.

When processing of this ESL is complete, LASTDT is updated with the current time at exit from ESLR process.

Given that time between entries to ESLR from a given spin routine is equal to ESLI plus a very small delta consisting of linkage time from the spin routine to the ESLR proces, it follows that the spin routine will continue to call ESLR in less than two spin loop time-out intervals until it has obtained its acquired resource. However, a given invocation of ESLR may be locked out if another CP has already serialized the ESLR function. Therefore, ESLR must be cognizant of all entries to ESLR from any CP. If no entry to ESLR occurs from any CP for two or more spin loop time-out intervals, then it follows that ALL spinning routines obtained ALL their desired resources subsequent to the last call to ESLR.

The next check is a determination whether the failing CP is in fact executing a routine that is exempted from excessive spin loop recovery processing (indicated in the LCCA block (27)). A mechanism for providing such an exemption is required because there are legitimate system routines which could otherwise trigger ESL conditions because the time to complete the function exceeds the ESL time-out value. This allows the system routines to set an indicator around the lengthy function in a field checked by the ESL recovery process. This exemption mechanism allows the ESL interval to be reduced far below its value in previous MVS systems of 40 seconds to significantly improve ESL recovery performance. It eliminates the need to spin for such long periods to avoid an ESL detection and recovery action for a legitimate, temporary condition. Some MVS functions included in this validly exempted category are those which load restartable CP wait states for operator communication, place a CP temporarily in a stopped state, or communicate with the operator via disabled console communication facility.

If the failing CP is not executing an exempt routine, recovery action is initiated for that failing CP. This recovery action processing is further described in FIG. 3. Having taken the appropriate recovery action, the current clock value is placed in the LAT field (26) of the failing CP and the global ESL field (LASTDT (28)) and return is made to the caller.

Figure 3:
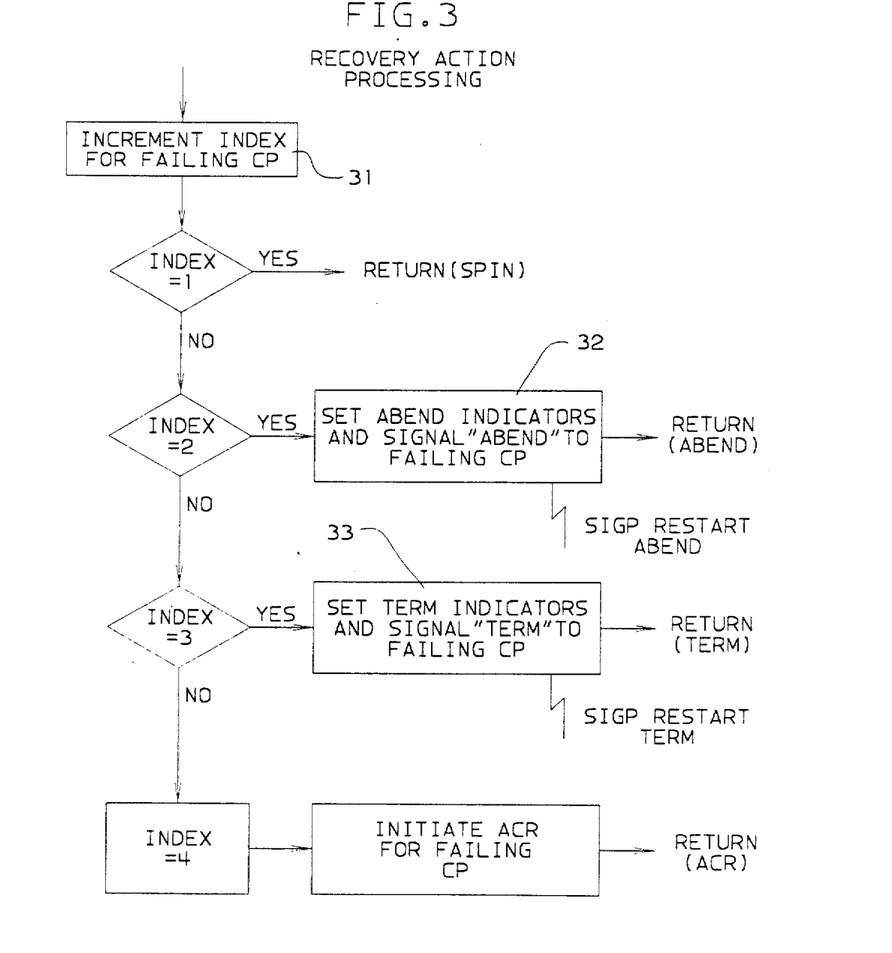
FIG. 3 is a function flow diagram showing the hierarchy of recovery actions taken within ESLR processing.

Referring to FIG. 3, on entry to recovery action processing an index is incremented associated with the failing CP. A check is then made against the value of the index. If the value equals 1, a return is made to the caller. This results in a continuation of spinning on the desired lock for another ESL interval. It is important to wait for this additional ESL interval since it is possible that a call may have been made to excessive spin loop recovery processing in the window of time between the clearing of the exemption flag and the enabling of the associated CP and in this case no disruptive recovery action is desired.

If the index is equal to 2, an indicator is set in the CVT control block indicating ABEND as the recovery action. A Signal Processor instruction indicating restart is then issued to the failing CP to give control to the restart FLIH. Return is then made to the caller. On the failing CP the RESTART FLIH checks the CVT indicator and sets a flag indicating the ABEND action and passes control to the Recovery Termination Manager to execute the ABEND action, which allows the recovery routines to retry after performing any necessary clean up.

If the index is equal to 3, the CVT flag is set to indicate the TERMINATE recovery option. A signal processor instruction indicating restart is then issued to the failing CP to cause the Recovery Termination Manager to begin running on that CP. The TERMINATE option differs from the ABEND option in that it does not allow recovery routines to retry. Resources owned by the failing unit of work are released, and the unit of work is forced to terminate. Return is then made to the caller.

If the index is equal to 4, Alternate CP Recovery (ACR) is initiated for the failing CP. This initiation is effected by the detecting processor simulating the receipt of a malfunction alert interruption from the failing CP which initiates actions resulting in taking this CP off-line.

6-WAY EXAMPLE

Figure 4:
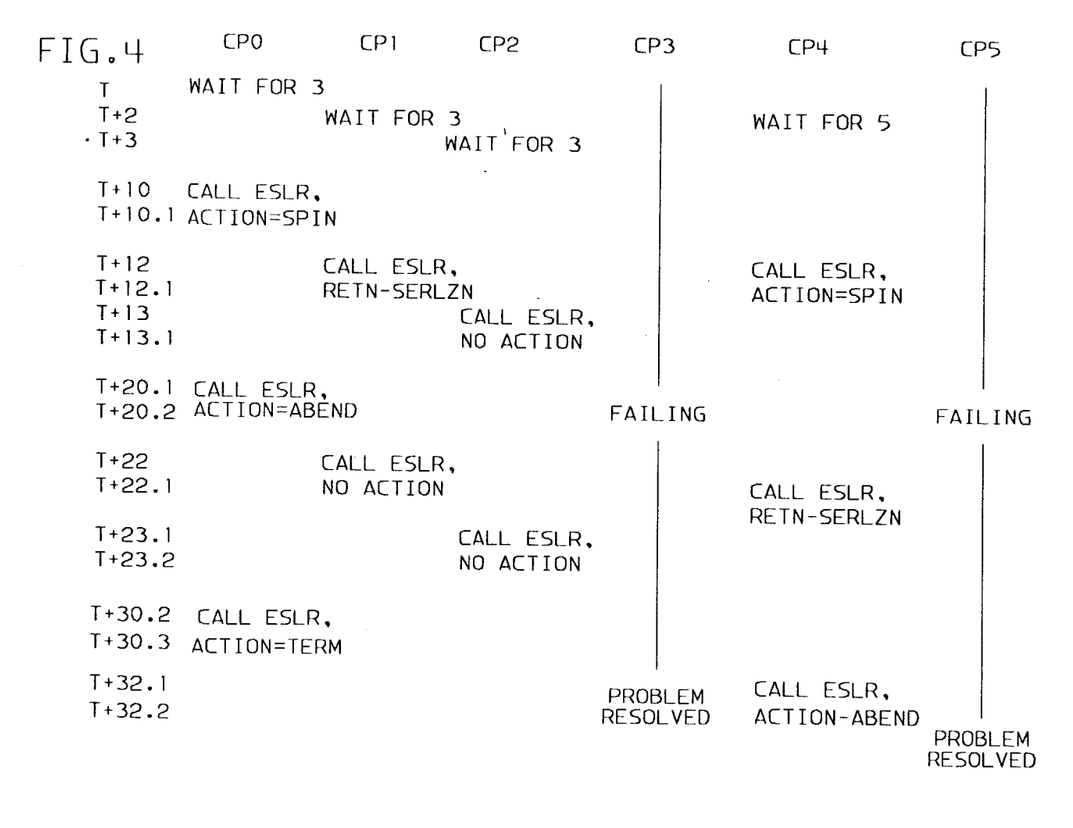
FIG. 4 is a linear time flow diagram showing a scenario in which ESLR processing is used to resolve a spin loop deadlock situation in a 6-way MP environment.

FIG. 4 illustrates Excessive Spin Loop Recovery processing active in a 6-WAY MP system, with two independent excessive spin loops: the first involves CPs 0, 1 and 2 all waiting for a resource held by failing CP 3; the second involves CP 4 waiting for a resource held by failing CP 5. The example shows:

1. Simultaneous resolution of independent ESLs
2. Correct progression through the hierarchy of recovery actions for each ESL taking increasingly severe action when previous action failed to resolve the problem.
3. Pacing of actions taken for related ESLs (multiple CPs spinning on the same failing CP).

At times, T, T+2, and T+3, the waiting CPs (0, 1, 2 and 4) request the needed resource of CP 3 or 5. At T+10, CP 0, noticing that an ESL interval (here, 10 seconds) has elapsed without obtaining the resource, calls ESLR processing, which sets the CP 3 index to 1 and saves the time of this ESLR processing (T+10.1) in the LAT field for CP 3 (FIG. 2B at 26), and LASTDT (28), and then returns to the caller who continues to spin (as indicated in FIG. 3, since this is the initial detection). At T+12, CP 4 detects an ESL, calls ESLR, which sets the CP 5 index to 1 and saves the time (T+12.1) in LAT entry for CP 5 (26) and LASTDT (28), and then continues to SPIN (FIG. 3). Simultaneously at T+12, CP 1 detected an ESL, and invoked ESLR—which immediately returned since ESLR was already active on CP 4 (see FIG. 2A at 21). At T+13, CP 2 detected its ESL, called ESLR, which takes no recovery action since one was taken for this failing CP (CP 3) within the last ESL interval (see FIG. 2A at 22). The time (T+13.1) is saved in LASTDT (28). At T+20.1, another ESL interval having passed for CP 0, ESLR is again invoked; since no action was taken for failing CP 3 within the last ESL interval (T+10.1-T+20.1) (see FIG. 2A at 22), a recovery action is taken, the index for CP 3 is incremented to 2 (FIG. 3 at 31), and the ABEND is signalled to CP 3 (32). The time (T+20.2) is saved in LAT for CP3 (26), and LASTDT (28). At T+22, CP 1 again detects the expiration of another ESL interval, calls ESLR, which takes no action since action was taken for CP 3 within the past ESL interval (FIG. 2A at 22). The time (T+22.1) is saved in LASTDT (28). Also at T+22.1, CP 4 detects the expiration of an ESL interval, calls ESLR, which immediately returns since ESLR is already running on CP 1 (FIG. 2A at 21). At T+23.1, CP 2 notes the passing of an ESL interval, calls ESLR, which takes no action since action was taken for CP 3 within the last ESL interval (FIG. 2A at 22). The time (T+23.2) is saved in LASTDT (28). At time T+30.2, CP 0 detects the passage of another ESL interval (the ABEND signalled to CP 3 at T+20.2 has not resolved the problem on CP 3), calls ESLR, which, since no action was taken for CP 3 within the last ESL interval, increments CP 3's index (FIG. 3 at 31) to 3, then signals "Terminate" to CP 3 (33). Time (T+30.3) is saved in the LAT entry for CP 3 (26) and in LASTDT (28). Note that in this example, the Terminate action against the unit of work on CP 3 resolves the spin loop on CPs 0, 1 and 2. At T+32.1 CP 4, detecting the expiration of another ESL interval (T+22.1-T+32.1) calls ESLR. ESLR, realizing that no action was taken for CP 5 within the last ESL interval (T+22.1-T+32.1; LAT for CP 5 is T+12.1), but there was an ESL detected against some CP within the last two ESL intervals (FIG. 2A at 23), ESLR increments the index associated with CP 5 to 2 (FIG. 3 at 31) and signals ABEND to CP 5 (32). The time (T+32.2) is saved in LAT for CP 5 (26), and in LASTDT (28). In the example, the ABEND action against the unit of work on CP 5 resolves the spin loop on CP 4.

Thus, while the invention has been described with reference to a preferred embodiment, it will be understood by those skilled in the art that various changes in form and details may be made without departing from the scope of the invention.

Having thus described our invention, what we claim as new and desire to secure by Letters Patent is:

1. In a multiprocessing system complex comprising at least two processors, an operating system, and resources shared among said processors, a method for recognition of and automatic recovery from excessive spin loops by the operating system comprising the steps of:

(A) detecting, by a detecting routine in a detecting processor, that said detecting processor has been in a spin loop requiring a resource held by a resource-holding routine in another processor for a fixed time period;

(B) identifying a target processor in said system complex as a cause of said another processor holding said resource for said fixed time period, and so being a target for responsive recovery action;

(C) performing no responsive recovery actions if a bypass indicator set by a routine in said target processor so indicates;

(D) automatically performing for said target processor one of a hierarchical sequence of responsive programmed recovery actions if said bypass indicator is off;

(E) continuing to identify said target and to perform subsequent hierarchical recovery actions for said target processor until said target processor is no longer so identified as said target;

(F) continuing to so detect the holding of any of said resources for said fixed time period and to identify target processors and perform target processor-specific hierarchical recovery actions until said any of said resources are acquired by said detecting processor.

2. The method of claim 1 in which a subsequent one of said recovery actions in said hierarchical sequence is performed for said target processor only if an immediately preceding one of said hierarchical recovery actions has been performed for said target processor longer ago than one of said fixed time periods.

3. The method of claim 2 in which said subsequent action in said hierarchical sequence is performed if there has been said detecting of one of said spin loops requiring one of said resources held by any of said processors in said multiprocessing complex within two of said fixed time periods, and in which an initial one of said hierarchical actions is performed otherwise.

4. The method of claim 3 in which said hierarchical sequence comprises the action of abnormally terminating said resurce-holding routine in said target processor in a manner that permits said resource-holding routine in said target processor to resume normal execution after cleanup.

5. The method of claim 3 in which said hierarchical sequence comprises the actions of:

(A) continuing to wait for said resource to be released for a second fixed time period;

(B) abnormally terminating said resource-holding routine in said target processor in a manner that permits said routine in said target processor to resume normal execution after cleanup;

(C) terminating said resource-holding routine in said target processor in a manner that does not permit said routine in said target processor to resume normal execution;

(D) removing said target processor from said multiprocessor system complex.

6. The method of claim 3 in which said hierarchical sequence comprises the following actions, in the order listed:

(A) continuing to wait for said resource to be released for a second fixed time period;

(B) abnormally terminating said resource-holding routine in said target processor in a manner that permits said routine in said target processor to resume normal execution after cleanup;

(C) terminating said resource-holding routine in said target processor in a manner that does not permit said routine in said target processor to resume normal execution;

(D) removing said target processor from said multiprocessor system complex.

7. In a multiprocessing system complex comprising at least two processors, an operating system, and resources shared among said processors, a mechanism for recognition of and automatic recovery from excessive spin loops by the operating system comprising:

(A) detection means for detecting that a first processor has been in a spin loop requiring a resource held by a resource-holding routine in a second processor for a fixed time period;

(B) identification means for identifying a target processor in said system complex as a cause of said second processor holding said resource for said fixed time period, and so being a target for responsive recovery action when said detecting means detects said spin loop, said identification means being responsive to invocation by said detection means;

(C) a processor-bypass indicator associated with each of said processors and having an "on" setting and an "off" setting, said bypass indicator being set to said "on" setting when an exempt routine is executing in said processor associated with said "on" bypass indicator;

(D) recovery means, responsive to invocation by said identification means, for freeing said resource held by said target processor only if said processor-bypass indicator associated with said target processor is "off".

8. The mechanism of claim 7 in which said recovery means comprises a hierarchical set of recovery functions, which further comprise an ABEND-triggering function for causing said resource-holding routine executing in said target processor to abnormally terminate, allowing retry.

9. The mechanism of claim 7 in which said recovery means comprises a hierarchical set of recovery functions, said functions comprising:

(A) a spin function for permitting said first processor to remain in said spin loop for a second fixed time period;

(B) an ABEND-triggering function for causing said resource-holding routine executing in said target processor to abnormally terminate, allowing retry;

(C) a TERMINATE-triggering function for causing said resource-holding routine executing in said target processor to terminate without retry;

(D) an ACR function for removing said target processor from said multiprocessor system complex.

10. The mechanism of claim 9 further comprising means for causing successive detections of said spin loop fixed time periods resulting in identification of the same target processor or a different target processor to cause invocation of one of said recovery functions, said recovery functions being invoked in the order A, B, C, D for a particular target processor, if one of said functions was invoked less recently than said fixed time period for said identified target processor.

11. The mechanism of claim 10 further comprising means for causing a successive detection of said spin loop fixed time period following a prior detection to invoke a sequential recovery function for said identified target processor when said successive detection occurs within 2 fixed time intervals of said prior detection.

* * * * *